United States Patent
Ryu et al.

(10) Patent No.: US 10,436,487 B2
(45) Date of Patent: Oct. 8, 2019

(54) AIR CONDITIONER AND METHOD FOR CONTROLLING AN AIR CONDITIONER

(71) Applicant: LG Electronics Inc., Seoul (KR)

(72) Inventors: Byoungjin Ryu, Seoul (KR); Younghwan Ko, Seoul (KR); Beomchan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 610 days.

(21) Appl. No.: 14/663,598

(22) Filed: Mar. 20, 2015

(65) Prior Publication Data

US 2015/0267954 A1    Sep. 24, 2015

(30) Foreign Application Priority Data

Mar. 20, 2014    (KR) .................. 10-2014-0032956

(51) Int. Cl.
*F25B 49/02*    (2006.01)

(52) U.S. Cl.
CPC .......... *F25B 49/02* (2013.01); *F25B 2500/19* (2013.01); *F25B 2600/0253* (2013.01); *F25B 2600/2509* (2013.01); *F25B 2600/2513* (2013.01); *F25B 2700/195* (2013.01); *F25B 2700/197* (2013.01); *F25B 2700/1931* (2013.01); *F25B 2700/2116* (2013.01); *F25B 2700/2117* (2013.01); *F25B 2700/21152* (2013.01); *Y02B 30/741* (2013.01)

(58) Field of Classification Search
CPC .................. F25B 49/02; F25B 2500/19; F25B 2700/2116; F25B 2600/2509; F25B 2600/0253; F25B 2700/1931; F25B 2700/195; F25B 2700/2117; F25B 2700/197; F25B 2600/2513; F25B 2700/21152; F25B 49/022; F25B 49/027; F25B 1/10; F25B 13/00; F25B 41/04; Y02B 30/741
USPC .............................. 62/117, 196.1, 504, 510
See application file for complete search history.

(56) References Cited

U.S. PATENT DOCUMENTS

| 4,637,219 A | * | 1/1987 | Grose | F25B 5/02 165/236 |
| 5,626,026 A | * | 5/1997 | Sumida | F25B 9/006 62/129 |
| 5,996,358 A | * | 12/1999 | Sumida | C09K 5/045 62/114 |

(Continued)

FOREIGN PATENT DOCUMENTS

KR    10-2014-0017833 A    2/2014

OTHER PUBLICATIONS

European Search Report issued in Application No. 15160039.2 dated Aug. 28, 2015.

*Primary Examiner* — Emmanuel E Duke
(74) *Attorney, Agent, or Firm* — Ked & Associates LLP (57) ABSTRACT

An air conditioner and a method for controlling an air conditioner are provided that efficiently inject a refrigerant into a compressor. The air conditioner may include a compressor to compress a refrigerant; a condenser to condense the refrigerant compressed at the compressor; an evaporator to evaporate the refrigerant condensed at the condenser; and an injection module to selectively or simultaneously inject some or a portion of the refrigerant flowing from the condenser to the evaporator into a high pressure side and a low pressure side of the compressor.

2 Claims, 7 Drawing Sheets

(56) References Cited

U.S. PATENT DOCUMENTS

| | | | | |
|---|---|---|---|---|
| 5,996,364 A * | 12/1999 | Lifson | F04C 28/24 | 62/196.1 |
| 6,122,924 A * | 9/2000 | Lifson | F04B 49/24 | 62/192 |
| 6,571,576 B1 * | 6/2003 | Lifson | F04C 29/042 | 62/196.1 |
| 6,857,287 B1 * | 2/2005 | Alsenz | F25B 1/00 | 62/45.1 |
| 6,883,341 B1 * | 4/2005 | Lifson | F04C 28/24 | 418/60 |
| 2005/0204766 A1 * | 9/2005 | Sasaki | F04B 35/04 | 62/259.2 |
| 2006/0080989 A1 * | 4/2006 | Aoki | F25B 13/00 | 62/324.4 |
| 2006/0162351 A1 * | 7/2006 | Yahia | B60H 1/3208 | 62/129 |
| 2006/0168996 A1 * | 8/2006 | Imai | F01C 21/0818 | 62/510 |
| 2006/0277931 A1 * | 12/2006 | Nakamura | F04C 27/005 | 62/196.1 |
| 2007/0193290 A1 * | 8/2007 | Ebara | B60H 1/00885 | 62/238.6 |
| 2008/0022706 A1 * | 1/2008 | Sakimichi | F25B 1/10 | 62/190 |
| 2008/0078192 A1 * | 4/2008 | Ignatiev | F25B 1/10 | 62/184 |
| 2009/0199581 A1 * | 8/2009 | Ushijima | F25B 30/02 | 62/238.7 |
| 2009/0241569 A1 * | 10/2009 | Okada | F25B 13/00 | 62/196.1 |
| 2010/0223939 A1 * | 9/2010 | Mitra | F25B 1/10 | 62/117 |
| 2011/0083456 A1 * | 4/2011 | Wakamoto | F25B 41/00 | 62/115 |
| 2011/0113804 A1 * | 5/2011 | Chin | F25B 1/04 | 62/222 |
| 2011/0113808 A1 * | 5/2011 | Ko | F25B 1/04 | 62/324.3 |
| 2011/0138827 A1 * | 6/2011 | Lifson | F04B 39/00 | 62/117 |
| 2011/0232325 A1 * | 9/2011 | Furui | F25B 13/00 | 62/510 |
| 2012/0060538 A1 * | 3/2012 | Saito | F24H 4/02 | 62/324.1 |
| 2012/0111050 A1 * | 5/2012 | Jang | F25B 13/00 | 62/510 |
| 2012/0125024 A1 * | 5/2012 | Ryu | F25B 40/02 | 62/115 |
| 2013/0000340 A1 * | 1/2013 | Takayama | F25B 9/008 | 62/222 |
| 2013/0081425 A1 * | 4/2013 | Jang | F04C 18/0292 | 62/498 |
| 2013/0213084 A1 * | 8/2013 | Takizawa | F04C 23/001 | 62/510 |
| 2013/0219927 A1 * | 8/2013 | Kim | F25B 30/02 | 62/324.1 |
| 2015/0107290 A1 * | 4/2015 | Hatomura | F25B 13/00 | 62/324.6 |
| 2015/0233622 A1 * | 8/2015 | Yajima | F25B 13/00 | 62/129 |
| 2015/0267957 A1 * | 9/2015 | Kim | F25B 47/025 | 62/81 |

* cited by examiner

AIR CONDITIONER AND METHOD FOR CONTROLLING AN AIR CONDITIONER

CROSS-REFERENCE TO RELATED APPLICATION(S)

This application claims priority under 35 U.S.C. § 119 to Korean Application No. 10-2014-0032956 filed in Korea on Mar. 20, 2014, whose entire disclosure is hereby incorporated by reference.

BACKGROUND

1. Field

An air conditioner and a method for controlling an air conditioner are disclosed herein.

2. Background

In general, an air conditioner including a compressor, an outdoor heat exchanger, an expansion valve, and an indoor heat exchanger heats or cools an indoor space using a refrigeration cycle. That is, the air conditioner may include a cooler to cool the indoor space, and a heater to hear the indoor space. In addition, the air conditioner may function to both heat and cool.

Such an air conditioner may inject some or a portion of a refrigerant condensed during a cooling or heating operation into a compressor, thereby enhancing efficiency thereof.

BRIEF DESCRIPTION OF THE DRAWINGS

Embodiments will be described in detail with reference to the following drawings in which like reference numerals refer to like elements, and wherein.

DETAILED DESCRIPTION

Embodiment will be described with reference to the drawings. Where possible, like reference numerals have been used to indicate like elements, and repetitive disclosure has been omitted.

Figure 1:
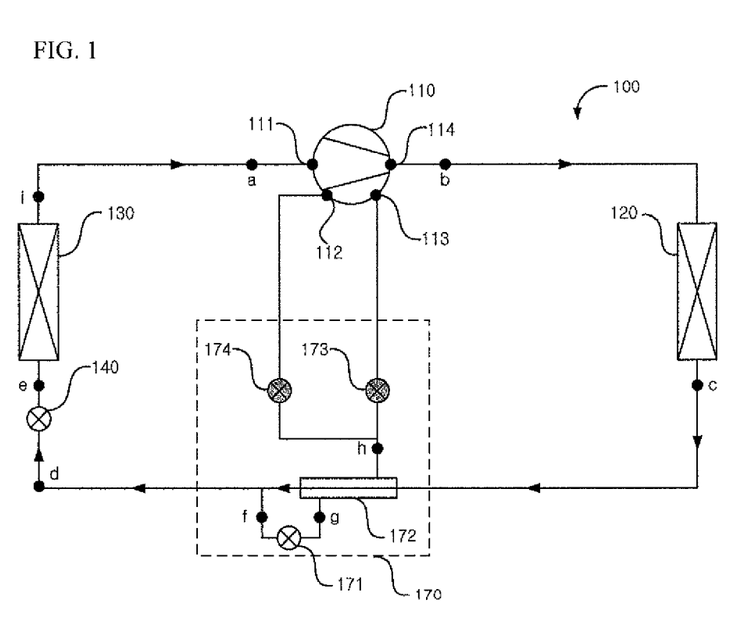
FIG. 1 is a schematic diagram of an air conditioner according to an embodiment.

FIG. 1 is a schematic diagram of an air conditioner according to an embodiment. The air conditioner 100 may include a compressor 110 to compress a refrigerant, a condenser 120 to condense the refrigerant compressed at the compressor 110, an evaporator 130 to evaporate the refrigerant condensed at the condenser 120, and an injection module 170 to selectively or simultaneously inject some or a portion of the refrigerant flowing from the condenser 120 to the evaporator 130 into a high pressure side and a low pressure side of the compressor 110.

The compressor 110 may compress the refrigerant, having a low temperature and pressure, into the refrigerant having a high temperature and pressure. The compressor 110 may have various structures, and may be, for example, a reciprocating compressor using a cylinder and a piston, or a scroll compressor using an orbiting scroll and a fixed scroll. The compressor 110 may be a scroll compressor according to this embodiment.

The compressor 110 may include a first inlet port 111 to introduce the refrigerant evaporated at the evaporator 130 into the compressor 110, a second inlet port 112 and a third inlet port 113 to introduce the refrigerant expanded and evaporated at or in an injection module 170 into the compressor 110, and a discharge port 114 to discharge the compressed refrigerant. The second inlet port 112 may be formed at a low pressure side of a compression chamber to compress the refrigerant in the compressor 110, and the third inlet port 113 may be formed at a high pressure side of the compression chamber in the compressor 110.

The low pressure side of the compressor 110 may be closer to the first inlet port 111 in the compression chamber, and the high pressure side of the compressor 110 is may be closer to the discharge port 114 in the compression chamber. The refrigerant introduced into the first inlet port 111 of the compressor 110 may be introduced into an inside of the compression chamber and discharged to the discharge port 114 through the high pressure side via the low pressure side.

The compressor 110 may compress the refrigerant introduced into the first inlet port 111 at the compression chamber, combine the refrigerant with the refrigerant introduced into the second inlet port 112 formed at the low pressure side of the compression chamber, and compress the combined refrigerant. The compressor 110 may compress the combined refrigerant, combine the refrigerant with the refrigerant introduced into the third inlet port 113 formed at the high pressure side of the compression chamber, and compress the combined refrigerant. The compressor 110 may compress the combined refrigerant and discharge it to the discharge port 114.

The condenser 120 connected to the compressor 110 may condense the refrigerant compressed at the compressor 110. The condenser 120 may be disposed at or in an outdoor space and may function as an outdoor heat exchanger to heat-exchanges outdoor air with the refrigerant when the air conditioner is a cooler that cools the indoor space, and the condenser 120 may be disposed at or in the indoor space and may function as an indoor heat exchanger that heat-exchanges indoor air with the refrigerant when the air conditioner is a heater that heats the indoor space. The condenser 120 may be connected to the injection module 170, and the refrigerant condensed at the condenser 120 may flow into the injection module 170.

A main expansion valve 140 may be disposed between the injection module 170 and the evaporator 130. The main expansion valve 140 may expand the refrigerant condensed at the condenser 120 and the refrigerant may be supercooled at the injection module 170. The refrigerant evaporated at the main expansion valve 140 may flow into the evaporator 130.

The evaporator 130 disposed between the main expansion valve 140 and the compressor 110 may evaporate the refrigerant expanded at the main expansion valve 140. The evaporator 130 disposed at or in the indoor space may be an indoor heat exchanger to heat-exchange indoor air with the refrigerant when the air conditioner is a cooler that cools the indoor space, and the evaporator 130 disposed at or in an outdoor space may be an outdoor heat exchanger that heat-exchanges outdoor air with the refrigerant when the air conditioner is a heater that heats the indoor space.

The injection module 170 disposed between the condenser 120 and the evaporator 130 may be connected to the high pressure side and the low pressure side of the compressor 110. The injection module 170 may be connected to the second inlet port 112 of the compressor 110, the third inlet port 111 of the compressor 110, the condenser 120, and the main expansion valve 140.

The injection module 170 may expand and evaporate some or a first portion of refrigerant condensed at the condenser 120 and flowing to the evaporator 130, and supercool the other or a second portion of the refrigerant. The injection module 170 connected to the high pressure side and the low pressure side of the compressor 110 may selectively or simultaneously injects some or a portion refrigerant flowing from the condenser 120 to the evaporator 130 into the high pressure side and the low pressure side of the compressor 110.

The injection module 170 may inject the refrigerant into the high pressure side of the compressor 110 or inject the refrigerant into the high pressure side and the low pressure side of the compressor 110 according to a compression ratio, which is a condensing pressure, that is, a pressure of the refrigerant condensed at the condenser 120 divided by an evaporation pressure, that is, a pressure of the refrigerant evaporated at the evaporator 130.

The injection module 170 may inject the refrigerant into the high pressure side of the compressor 110 in a case in which the compression ratio is lower than a preset or predetermined reference compression ratio. The injection module may inject the refrigerant into the high pressure side and the low pressure side of the compressor 110 in a case in which the compression ratio is higher than the preset or predetermined reference compression ratio.

The injection module 170 may include an injection expansion valve 171 to expand some or a first portion of the refrigerant flowing from the condenser 120, an injection heat exchanger 172 that heat-exchanges and evaporates the first portion of the refrigerant expanded at the injection expansion valve 171 with a second portion of the refrigerant flowing from the condenser 120, a high pressure injection valve 173 disposed between the injection heat exchanger 172 and the high pressure side of compressor 110, to control a flow of the refrigerant evaporated at the injection heat exchanger 172, and a low pressure injection valve 174 disposed between the injection heat exchanger 172 and the low pressure side of compressor 110, to control a flow of the refrigerant evaporated at the injection heat exchanger 172.

The injection expansion valve 171 may be connected to the injection heat exchanger 172 and the main expansion valve 140. The injection expansion valve 171 may expand some or the first portion of the refrigerant condensed at the condenser 120 and supercooled at the injection heat exchanger 172, and guide the expanded refrigerant into the injection heat exchanger 172. According to an embodiment, the injection expansion valve 171 may be connected to the condenser 120 and the injection heat exchanger 172, and may expand some or the first portion of the refrigerant condensed at the condenser 120.

The injection heat exchanger 172 may be connected to the condenser 120, the main expansion valve 171, the high pressure injection valve 173, and the low pressure injection valve 174. The injection heat exchanger 172 may heat-exchange the refrigerant condensed at the condenser 120 with the refrigerant expanded at the injection expansion valve 171. The injection heat exchanger 172 may heat-exchange the refrigerant flowing from the condenser 120 with the refrigerant expanded at the injection expansion valve 171 and the heat-exchanged refrigerant may be supercooled, and the injection heat exchanger 172 may heat-exchange the refrigerant expanded at the injection expansion valve 171 with the refrigerant flowing from the condenser 120 and the heat-exchanged refrigerant may be evaporated.

The injection heat exchanger 172 may supercool the refrigerant condensed at the condenser 120 and guide the supercooled refrigerant into the main expansion valve 140 and/or the injection expansion valve 171. The injection heat exchanger 172 may evaporate the refrigerant expanded at the injection expansion valve 171 and guide the evaporated refrigerant into the high pressure injection valve 173 and/or the low pressure injection valve 174.

The high pressure injection valve 173 may be disposed between the injection heat exchanger 172 and the high pressure side of the compressor 110. The high pressure injection valve 173 may be connected to the injection heat exchanger 172 and the third inlet port 113.

The high pressure injection valve 173 may control a flow of the refrigerant evaporated at the injection heat exchanger 172. The refrigerant evaporated at the injection heat exchanger 172 may be injected into the high pressure side of the compressor 110 via the third inlet port 113 by opening the high pressure injection valve 173. The refrigerant evaporated at the injection heat exchanger 172 may not flow into the third inlet port 113 on closing of the high pressure injection valve 173.

The low pressure injection valve 174 may be disposed between the injection heat exchanger 172 and the low pressure side of the compressor 110. The low pressure injection valve 174 may be connected to the injection heat exchanger 172 and the second inlet port 112.

The low pressure injection valve 174 may control a flow of the refrigerant evaporated at the injection heat exchanger 172. The refrigerant evaporated at the injection heat exchanger 172 may be injected into the low pressure side of the compressor 110 via the second inlet port 112 by opening the low pressure injection valve 174. The refrigerant evaporated at the injection heat exchanger 172 may not flow into the second inlet port 112 on closing of the low pressure injection valve 173.

The high pressure injection valve 173 and the low pressure injection valve 174 may be opened and closed according to the compression ratio, which is the condensing pressure, that is, the pressure of the refrigerant condensed at the condenser 120 divided by the evaporation pressure, that is, the pressure of the refrigerant evaporated at the evaporator 130. When the compression ratio is lower than the preset or predetermined reference compression ratio, the high pressure injection valve 173 may be opened and the low pressure injection valve 174 is closed. When the compression ratio is higher than the preset or predetermined reference compression ratio, both the high pressure injection valve 173 and the low pressure injection valve 174 may be opened.

Figure 2:
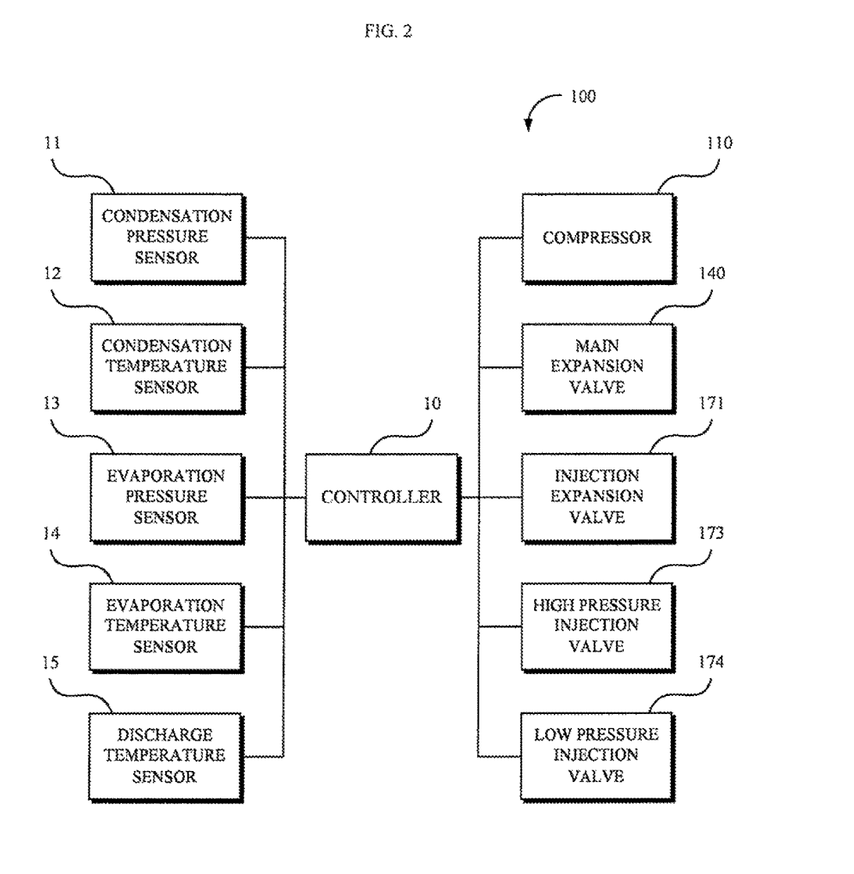
FIG. 2 is a block diagram of the air conditioner according to an embodiment.

FIG. 2 is a block diagram of the air conditioner according to an embodiment. Referring to FIG. 2, the air conditioner according to an embodiment may include a controller 10 that controls the air conditioner, a condensation pressure sensor 11 to measure a condensation pressure of the refrigerant condensed at the condenser 120, a condensation temperature sensor 12 to measure a condensation temperature of the refrigerant condensed at the condenser 120, an evaporation pressure sensor 13 to measure an evaporation pressure of the refrigerant evaporated at the evaporator 130, an evaporation temperature sensor 14 to measure an evaporation temperature of the refrigerant evaporated at the evaporator 130, and a discharge temperature sensor 15 to measure a discharge temperature of the refrigerant discharged from the compressor 110.

The controller 10, which may control an operation of the air conditioner, may control the compressor 110, the main expansion valve 140, the injection expansion valve 171, the high pressure injection valve 173, and the low pressure injection valve 174. The controller 10 may control an operation velocity of the compressor 110 and an opening of the main expansion valve 140 according to load. The controller 10 may close the injection expansion valve 171 or open the injection expansion valve 171 according to operating conditions.

When the above-described compression ratio is lower than the preset or predetermined reference compression ratio, the controller 10 may open the high pressure injection valve 173 and close the low pressure injection valve 174. When the compression ratio is higher than the preset or predetermined reference compression ratio, the controller 10 may open both the high pressure injection valve 173 and the low pressure injection valve 174.

The condensation pressure sensor 11 may measure the condensation pressure of the refrigerant condensed at the condenser 120. The condensation pressure sensor 11 may be disposed at various points, may measure the condensation pressure of the refrigerant, and may be disposed at point c according to this embodiment. According to this embodiment, the condensation pressure sensor 11 may be disposed at the condenser 120. Alternatively, the condensation pressure of the refrigerant may be converted from the condensation temperature of the refrigerant measured by the condensation temperature sensor 12 according to this embodiment.

The condensation temperature sensor 12 may measure the condensation temperature of the refrigerant condensed at the condenser 120. The condensation temperature sensor 12 may be disposed at various points, may measure the condensation temperature of the refrigerant, and may be disposed at the point c according to this embodiment. According to this embodiment, the condensation temperature sensor 12 may be disposed at the condenser 120. Alternatively, the condensing temperature of the refrigerant may be converted from the condensation pressure of the refrigerant measured by the condensation pressure sensor 11 according to this embodiment.

The evaporation pressure sensor 13 may measure the evaporation pressure of the refrigerant evaporated at the evaporator 130. The evaporation pressure sensor 13 may be disposed at various points, may measure the evaporation pressure of the refrigerant, and may be disposed at point i according to this embodiment. According to this embodiment, the evaporation pressure sensor 13 may be disposed at the evaporator 13. Alternatively, the evaporating pressure of the refrigerant may be converted from the evaporation temperature of the refrigerant measured by the evaporation temperature sensor 14 according to this embodiment.

The evaporation temperature sensor 14 may measure the evaporation temperature of the refrigerant evaporated at the evaporator 130. The evaporation temperature sensor 14 may be disposed at various points, may measure the evaporation temperature of the refrigerant, and may be disposed at point i according to this embodiment. According to this embodiment, the evaporation temperature sensor 14 may be disposed at the evaporator 130. Alternatively, the evaporating temperature of the refrigerant may be converted from the evaporation pressure of the refrigerant measured by the evaporation pressure sensor 13 according to this embodiment.

The discharge temperature sensor 15 may measure the discharge temperature of the refrigerant compressed at the compressor 110 and discharged to the discharge port 114. The discharge temperature sensor 15 may be disposed at various points, may measure the temperature of the refrigerant discharged from the compressor 110, and may be disposed at point b according to this embodiment.

Figure 3:
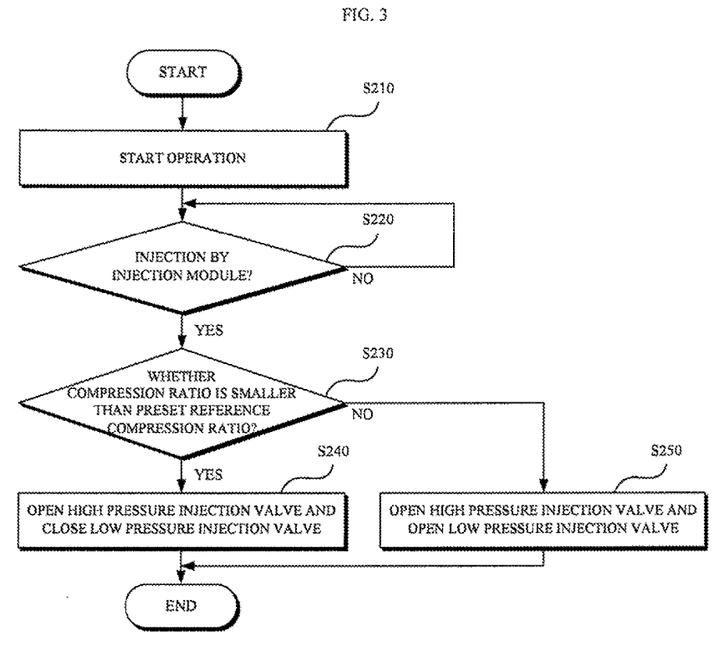
FIG. 3 is a flow chart of a method for controlling the air conditioner according to an embodiment.
Figure 4:
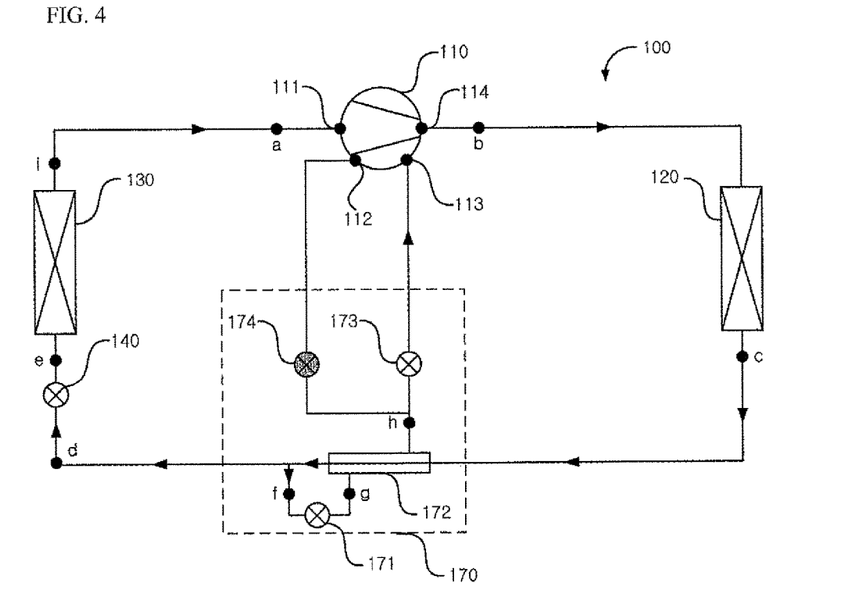
FIG. 4 is a configuration view representing when an injection module of the air conditioner according to an embodiment injects a refrigerant only into a high pressure side of the compressor.
Figure 5:
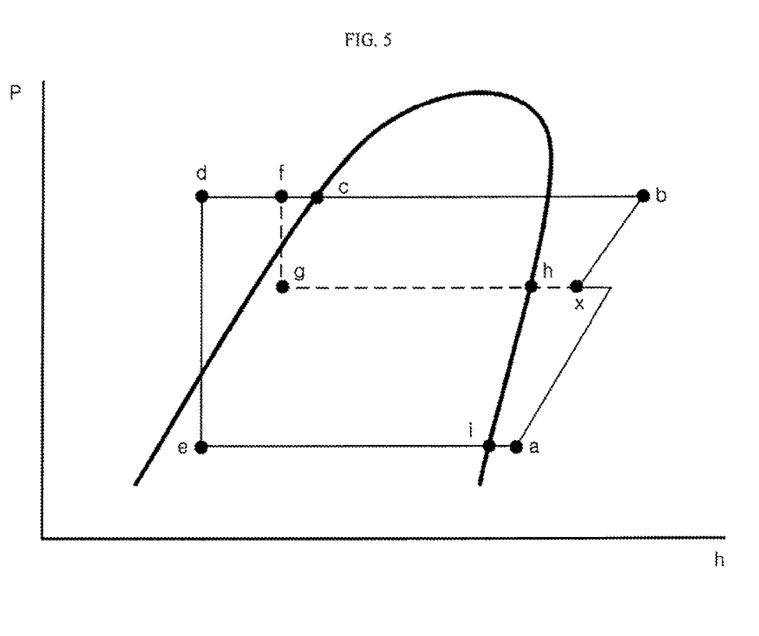
FIG. 5 is a Pressure-Enthalpy Diagram (hereinafter, refers to a "P-h Diagram") of the air conditioner of FIG. 4.
Figure 6:
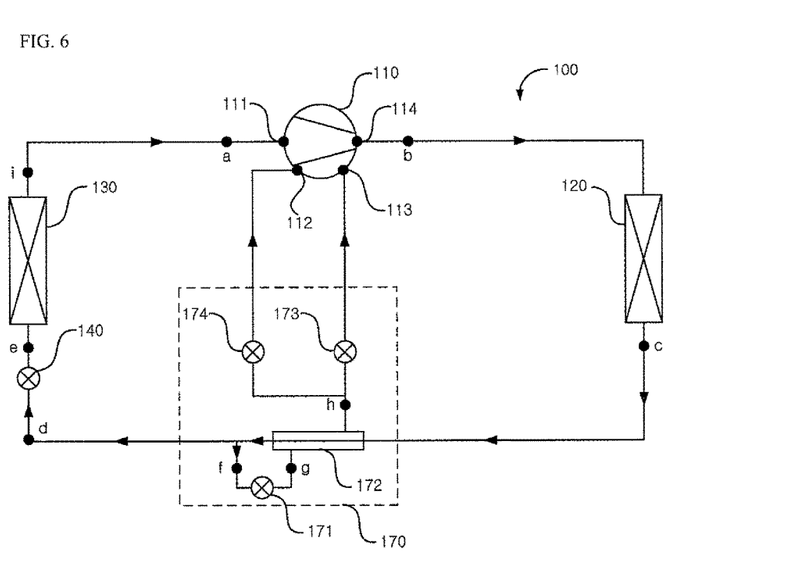
FIG. 6 is a configuration view representing when an injection module of the air conditioner according to an embodiment injects a refrigerant into the high pressure side and a low pressure side of the compressor.
Figure 7:
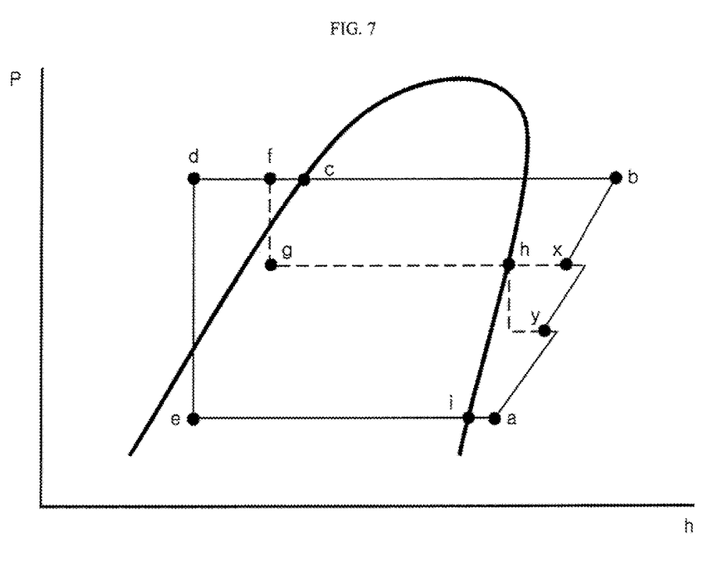
FIG. 7 represents the P-h Diagram of the air conditioner of FIG. 6.

FIG. 3 is a flow chart of a method for controlling the air conditioner according to an embodiment. FIG. 4 is a configuration view representing when the injection module of the air conditioner according to an embodiment injects a refrigerant only into the high pressure side of the compressor. FIG. 5 is a Pressure-Enthalpy Diagram (hereinafter, refers to a "P-h Diagram") of the air conditioner of FIG. 4. FIG. 6 is a configuration view representing when the injection module of the air conditioner according to an embodiment injects a refrigerant into the high pressure side and the low pressure side of the compressor. FIG. 7 represents the P-h Diagram of the air conditioner of FIG. 6.

The controller 10 may start operation, in step S210. On starting the operation, the controller 10 may close the injection expansion valve 171, the high pressure injection valve 173, and the low pressure injection valve 174, and control an operation velocity of the compressor 110 and the opening of the main expansion valve 140 according to operation logics.

Referring to FIG. 3, operation of the air conditioner according to this embodiment on starting operation will be described hereinbelow.

The refrigerant compressed at the compressor 110 may be discharged through the discharge port 114. The refrigerant discharged to the discharge port 114 may flow into the condenser 120.

The refrigerant flowing into the condenser 120 may be heat-exchanged and condensed with air. The refrigerant flowing into the condenser 120 may be heat-exchanged with outdoor air when the air conditioner is the cooler, and the refrigerant flowing into the condenser 120 may be heat-exchanged with indoor air when the air conditioner is the heater. The refrigerant condensed at the condenser 120 may flow into the injection module 170.

On starting the operation, the expansion valve 171 may be closed, and therefore, the refrigerant flowing into the injection module 170 may be guided into the main expansion valve 140. The refrigerant flowing into the main expansion valve 140 may be expanded. The refrigerant expanded at the main expansion valve 140 may flow into the evaporator 130.

The refrigerant flowing into the evaporator 130 may be heat-exchanged and evaporated with air. The refrigerant flowing into the evaporator 130 may be heat-exchanged with indoor air when the air conditioner is the cooler, and the refrigerant flowing into the condenser 130 may be heat-exchanged with outdoor air when the air conditioner is the heater. The refrigerant evaporated at the evaporator 130 may flow into the first inlet port 111 of the compressor 110. The refrigerant flowing into the first inlet port 111 may be compressed at the compressor 110, and then, the compressed refrigerant discharged to the discharge port 114.

The controller 10 may determine whether to inject refrigerant by the injection module 170, in step S220. The controller 10 may determine whether to inject the refrigerant into the compressor 110 by the injection module 170 on satisfying injection conditions. The injection conditions may be set as the operation velocity of the compressor 110, the discharge superheat, the condensation temperature, the evaporation temperature, or the compression ratio, for example.

The operation velocity of the compressor 110, which is a rotational velocity of a motor (not shown) that generates a rotational force to compress the refrigerant in the compressor 110, may be represented in frequencies. The operation velocity of the compressor 110 may be proportional to a compression capacity of the compressor 110. The controller 10 may determine whether the operation velocity of the compressor 110 is higher than the preset or predetermined operation velocity to determine whether the injection conditions are satisfied.

The discharge superheat is a difference between the discharge temperature measured by the discharge temperature sensor 15 and the condensation temperature measured by the condensation temperature sensor 12. That is, it (the discharge superheat) equals (the discharge temperature)− (the condensation temperature). The controller 10 may determine whether the discharge superheat is higher than the preset or predetermined discharge superheat to determine whether the injection conditions are satisfied.

The condensation temperature may be the condensation temperature of the refrigerant measured by the condensation temperature sensor 12. The condensation temperature may be a temperature for condensation of the refrigerant at the condenser 120. The controller 10 may determine whether the condensation temperature is satisfied for the set conditions to determine whether the injection conditions are satisfied.

The evaporation temperature may be the evaporation temperature of the refrigerant measured by the evaporation temperature sensor 14. The evaporation temperature may be the evaporation temperature for the refrigerant at the evaporator 130. The controller 10 may determine whether the evaporation temperature is satisfied for the set conditions to determine whether the injection conditions are satisfied. The condensation temperature and the evaporation temperature may have a mutually linear inequality relation.

The compression ratio is a value, which is the condensation pressure, that is, the pressure of the refrigerant condensed at the condenser 120 divided by the evaporation pressure, that is, the pressure of the refrigerant evaporated at the evaporator 130. That is, (the compression ratio) equals (the condensation pressure)/(the evaporation pressure). The condensation pressure may be the condensation pressure of the refrigerant measured by the condensation pressure sensor 11 and may be the pressure of the refrigerant condensed at the condenser 120. The evaporation pressure may be the evaporation pressure of the refrigerant measured by the evaporation pressure sensor 13 and may be the pressure of the refrigerant evaporated at the evaporator 130. The controller 10 may determine whether the compression ratio is larger than a minimum compression ratio for injecting to determine whether the injection conditions are satisfied.

According to an embodiment, the injection conditions may be set so that any one or at least two of an operation velocity of the compressor 110, the discharge superheat, the condensation temperature, the evaporation temperature, and the compression ratio on performing a heating operation is satisfied for the conditions.

The controller 10 may determine whether the compression ratio is smaller than the preset or predetermined reference compression ratio in the case that the injection conditions are satisfied, in step S230. The reference compression ratio, which may be a preset or predetermined stored value, may be set to be larger than the above-described minimum compression ratio. The reference compression ratio may be set to a compression ratio for high performance of the air conditioner. That is, the reference compression ratio may be a compression ratio when a temperature of the indoor space in which the evaporator 130 is disposed is a lot higher than a set temperature requested by a user, and therefore, a load is generated at the air conditioner, in a case in which the air conditioner is the cooler, or is a compression ratio when a temperature of the indoor space in which the condenser 120 is disposed is a lot lower than a temperature requested by the user, and therefore, a large load is generated at the air conditioner, in a case in which the air conditioner is the heater.

The air conditioner may perform a high efficiency operation when the compression ratio is lower than the reference compression ratio, and the air conditioner may perform a high performance operation when the compression ratio is higher than the reference compression ratio. When the compression ratio is lower than the reference compression ratio, the controller 10 may open the high pressure injection valve 173 and close the low pressure injection valve 174, in step S240. Further, the controller 10 may control the opening degree of the injection expansion valve 171. When the compression ratio is lower than or the same as the reference compression ratio according to this embodiment, the controller 10 may open the high pressure injection valve 173 and close the low pressure injection valve 174. When the compression ratio is lower than the reference compression ratio, the injection module 170 may inject the refrigerant only into the high pressure side of the compressor 110.

Referring to FIG. 4 and FIG. 5, when the injection module injects the refrigerant only into the high pressure side of the compressor, operation of the air conditioner according to an embodiment will be described hereinbelow. The refrigerant compressed at the compressor 110 may be discharged through the discharge port 114. The refrigerant discharged to the discharge port 114 may flow into the condenser 120.

The refrigerant flowing into the condenser 120 may be heat-exchanged and condensed with air. The refrigerant flowing into the condenser 120 may be heat-exchanged with outdoor air when the air conditioner is the cooler, and the refrigerant flowing into the condenser 120 may be heat-exchanged with indoor air when the air conditioner is the heater. The refrigerant condensed at the condenser 120 may flow into the injection module 170.

When the compression ratio is lower than the reference compression ratio, the injection expansion valve 171 may be opened, and therefore, the refrigerant flowing into the injection heat exchanger 172 may be heat-exchanged and super-cooled with the refrigerant expanded at the injection expansion valve 171. Some or a first portion of the refrigerant supercooled at the injection heat exchanger 172 may flow into the injection expansion valve 171, and the other or a second portion of the refrigerant may flow into the main expansion valve 140.

The refrigerant flowing into the injection expansion valve 171 may be expanded at the injection expansion valve 171. The refrigerant expanded at the injection expansion valve 171 may be heat-exchanged and evaporated with the refrigerant flowing from the condenser 120 at the injection heat exchanger 172.

The high pressure injection valve 173 may only be opened when the compression ratio is lower than the reference compression ratio, and therefore, the refrigerant evaporated at the injection heat exchanger 172 may flow into the third inlet port 113 of the compressor 110 via the opened high pressure injection valve 173. The refrigerant flowing into the third inlet port 113 may be injected into the high pressure side of the compressor 110, the injected refrigerant may be compressed, and the compressed refrigerant may be discharged into the discharge port 114.

The refrigerant flowing into the main expansion valve 140 may be expanded. The refrigerant expanded at the main expansion valve 140 may flow into the evaporator 130. The refrigerant flowing into the evaporator 130 may be heat-exchanged and evaporated with air. The refrigerant flowing into the evaporator 130 may be heat-exchanged with indoor air when the air conditioner is the cooler, and the refrigerant flowing into the evaporator 130 may be heat-exchanged with outdoor air when the air conditioner is the heater.

The refrigerant evaporated at the evaporator 130 may flow into the first inlet port 111 of the compressor 110. The refrigerant flowing into the first inlet port 111 may be compressed at the compressor 110, may be compressed together with the refrigerant injected via the third inlet port 113 at the high pressure side, and the compressed refrigerant may be discharged into the discharge port 114.

Referring to FIG. 5, the refrigerant supercooled (at point f) at the injection heat exchanger 172 may be expanded (at point g) at the injection expansion valve 171 and evaporated (at point h) at the injection heat exchanger 172. The refrigerant evaporated at the injection heat exchanger 172 may be injected into the high pressure side (at point x) of the compressor 110. Referring to FIG. 5, compression processes may be divided into two steps to enhance efficiency of the compressor 110, such that it is possible to perform the operation having high efficiency.

When the compression ratio is lower than the reference compression ratio, the controller 10 may open the high pressure injection valve 173 and close the low pressure injection valve 174, in step S240. Further, the controller 10 may control the opening of the injection expansion valve 171.

When the compression ratio is higher than or the same as the reference compression ratio, the controller 10 may open the high pressure injection valve 173 and open the low pressure injection valve 174, in step S250. Further, the controller 10 may control the opening of the injection expansion valve 171. When the compression ratio is higher than the reference compression ratio according to this embodiment, the controller 10 may open the high pressure injection valve 173 and open the low pressure injection valve 174.

When the compression ratio is higher than or the same as the reference compression ratio, the injection module 170 may inject the refrigerant into the high pressure side and the low pressure side of the compressor 110. Referring to FIG. 6 and FIG. 7, when the injection module 170 injects the refrigerant into the high pressure side and the low pressure side of the compressor 110, operation of the air conditioner according to an embodiment will be described hereinbelow.

The refrigerant compressed at the compressor 110 may be discharged through the discharge port 114. The refrigerant discharged to the discharge port 114 may flow into the condenser 120.

The refrigerant flowing into the condenser 120 may be heat-exchanged and condensed with air. The refrigerant flowing into the condenser 120 may be heat-exchanged with outdoor air when the air conditioner is the cooler, and the refrigerant flowing into the condenser 120 may be heat-exchanged with indoor air when the air conditioner is the heater. The refrigerant condensed at the condenser 120 may flow into the injection module 170.

When the compression ratio is higher than or the same as the reference compression ratio, the injection expansion valve 171 may be opened, and therefore, the refrigerant flowing into the injection heat exchanger 172 may be heat-exchanged and supercooled with the refrigerant expanded at the injection expansion valve 171. Some or a first portion of the refrigerant supercooled at the injection heat exchanger 172 may flow into the injection expansion valve 171, and the other or a second portion of the refrigerant may flow into the main expansion valve 140.

The refrigerant flowing into the injection expansion valve 171 may be expanded at the injection expansion valve 171. The refrigerant expanded at the injection expansion valve 171 may be heat-exchanged and evaporated with the refrigerant flowing from the condenser 120 at the injection heat exchanger 172.

Both the high pressure injection valve 173 and the low pressure injection valve 174 may be opened when the compression ratio is higher than or the same as the reference compression ratio, and therefore, the refrigerant evaporated at the injection heat exchanger 172 may pass through the opened high pressure injection valve 173 and the low pressure injection valve 174. The refrigerant passing through the low pressure injection valve 174 may flow into the second inlet port 112 of the compressor 110, may be injected into the low pressure side of the compressor 110 and compressed, and then may be discharged into the discharge port 114. The refrigerant passing through the high pressure injection valve 173 may flow into the third inlet port 113 of the compressor 110, may be injected into the high pressure side of the compressor 110 and compressed, and then may be discharged into the discharge port 114.

The refrigerant flowing into the main expansion valve 140 may be expanded. The refrigerant expanded at the main expansion valve 140 may flow into the evaporator 130. The refrigerant flowing into the evaporator 130 may be heat-exchanged and evaporated with air. The refrigerant flowing into the evaporator 130 may be heat-exchanged with indoor air when the air conditioner is the cooler, and the refrigerant flowing into the evaporator 130 may be heat-exchanged with outdoor air when the air conditioner is the heater.

The refrigerant evaporated at the evaporator 130 may flow into the first inlet port 111 of the compressor 110. The refrigerant flowing into the first inlet port 111 may be compressed at the compressor 110, may be compressed together with the refrigerant injected via the second inlet port 112 at the low pressure side and the refrigerant injected via the third inlet port 113 at the high pressure side, and the compressed refrigerant may be discharged to the discharge port 114.

Referring to FIG. 7, the refrigerant supercooled (at point f) at the injection heat exchanger 172 may be expanded (at point g) at the injection expansion valve 171 and evaporated (at point h) at the injection heat exchanger 172. The refrigerant evaporated at the injection heat exchanger 172 may be injected into the low pressure side (at point y) and the high pressure side (at point x) of the compressor 110. As the refrigerant is injected at two points as shown in FIG. 7, flow injected into the compressor 110 may be maximized, thereby enhancing performance of the compressor 110 and performing the operation having high performance.

An air conditioner and a method for controlling an air conditioner according to embodiments disclosed herein may have at least the following advantages.

First, refrigerant may be selectively or simultaneously injected into a high pressure side and a low pressure side of a compressor.

Second, on injecting refrigerant into the high pressure side and low pressure side of the compressor, one injection module may be used, thereby simplifying a structure thereof.

Third, the refrigerant may be selectively or simultaneously injected into the high pressure side and the low pressure side of the compressor according to a compression ratio, thereby enhancing a performance or efficiency thereof.

Embodiments disclosed herein provide an air conditioner and a method for controlling an air conditioner capable of efficiently injecting a refrigerant into a compressor.

Embodiments disclosed herein provide an air conditioner and a method for controlling an air conditioner capable of selectively or simultaneously injecting refrigerant into a high pressure side and a low pressure side of a compressor.

Embodiments are not limited to the mentioned problems, and other problems, which are not described above, may be obviously understood to those skilled in the art from the description.

Embodiments disclosed herein provide an air conditioner that may include a compressor to compress a refrigerant; a condenser to condense the refrigerant compressed at the compressor; an evaporator to evaporate the refrigerant condensed at the condenser, and an injection module to selectively or simultaneously inject some or a portion of the refrigerant flowing from the condenser to the evaporator into a high pressure side and a low pressure side of the compressor.

Embodiments disclosed herein further provide a method for controlling an air conditioner that may include a compressor to compress a refrigerant, a condenser, connected to the compressor, to condense the refrigerant, an evaporator, connected to the condenser, to evaporate the refrigerant, and an injection module, disposed between the condenser and the evaporator and connected to a high pressure side and a low pressure side of the compressor, to expand and evaporate some or a portion of the refrigerant flowing from the condenser to the evaporator. The method may include determining whether the injection module may inject the refrigerant into the compressor; and selectively or simultaneously injecting some or a portion of the refrigerant flowing from the condenser to the evaporator into the high pressure side or the low pressure side of the compressor by the injection module when it is possible to inject the injection module.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
    a compressor to compress a refrigerant;
    a condenser to condense the refrigerant compressed at the compressor;
    an evaporator to evaporate the refrigerant condensed at the condenser; and
    an injection module disposed between the condenser and the evaporator, and connected to a high pressure side and a low pressure side of the compressor to inject a portion of the refrigerant flowing from the condenser; and
    a controller that controls the injection module, wherein the injection module comprises:
        an injection expansion valve disposed between the condenser and the evaporator to expand the portion of the refrigerant flowing from the condenser;
        an injection heat exchanger connected to the injection expansion valve to heat-exchange and evaporate the portion of the refrigerant expanded at the injection expansion valve with the refrigerant flowing from the condenser;
        a high pressure injection valve, disposed between the injection heat exchanger and the high pressure side of the compressor, to control a flow of the refrigerant evaporated by the injection heat exchanger; and
        a low pressure injection valve, disposed between the injection heat exchanger and the low pressure side of the compressor, to control the flow of the refrigerant evaporated by the injection heat exchanger, wherein the injection heat exchanger is disposed between the condenser and the evaporator and is connected to the high pressure injection valve and the low pressure injection valve, wherein the controller opens the high pressure injection valve and closes the low pressure injection valve to inject the refrigerant into the high pressure side of the compressor in a case in which a compression ratio is lower than a predetermined reference compression ratio, wherein the compression ratio is a condensation pressure, which is a pressure of the refrigerant condensed at the condenser, divided by an evaporation pressure, which is a pressure of the refrigerant evaporated at the evaporator, and wherein the controller opens the high pressure injection valve and opens the low pressure injection valve to inject the refrigerant into the high pressure side and the low pressure side of the compressor in a case in which the compression ratio is higher than or the same as the predetermined reference compression ratio.

2. The air conditioner according to claim 1, further comprising:
    a main expansion valve, disposed between the injection module and the evaporator, to expand the refrigerant.

* * * * *